Sept. 11, 1928.
G. R. PENNINGTON
1,684,069
BELT DRIVING MECHANISM
Original Filed April 18, 1922
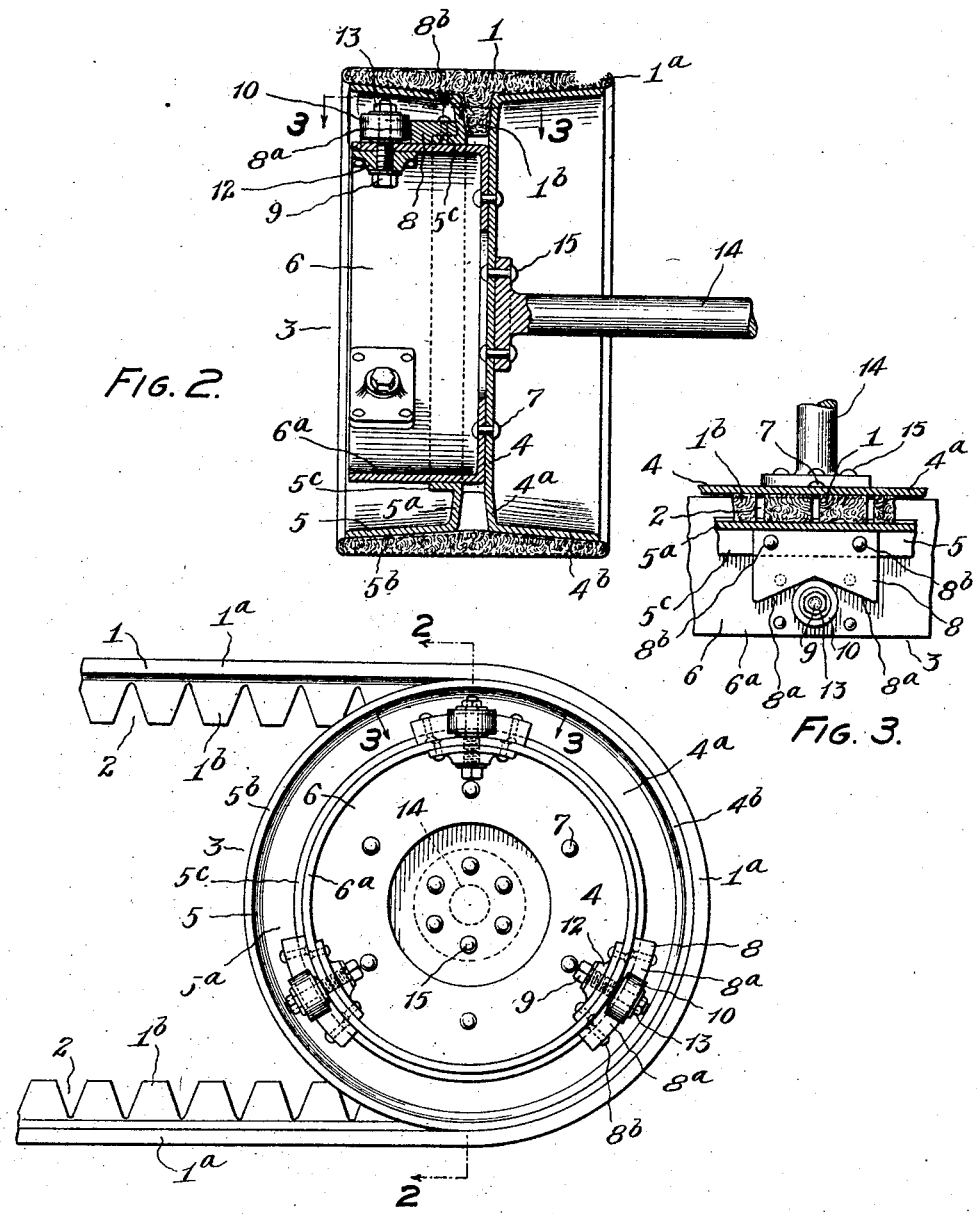
INVENTOR:
Gordon R. Pennington
BY Ray S. Fehr
ATTORNEY Patented Sept. 11, 1928.

1,684,069

UNITED STATES PATENT OFFICE.

GORDON R. PENNINGTON, OF CLEVELAND, OHIO.

BELT DRIVING MECHANISM.

Application filed April 18, 1922, Serial No. 555,135. Renewed December 16, 1927.

This invention relates to belt driving mechanism useful for various purposes where it is desirable to transmit considerable power by frictional engagement of a belt with a driving or driven wheel. However, the invention is especially useful in connection with endless belt traction mechanism of motor vehicles where the belt constitutes the track upon which the vehicle wheels run and by engagement with which the vehicle is driven.

One of the objects of the invention is to provide an improved belt driving mechanism adapted by friction alone to transmit great power.

Another object of the invention is to provide a belt driving or driven wheel having an improved belt-gripping mechanism and which is simple in construction, light in weight and at the same time capable of sustaining heavy stresses without any serious strain likely to result in fracture of the parts or distortion thereof great enough to render the transmission of power ineffective or inefficient.

Other objects more or less incidental or ancillary to the foregoing, and the manner of attaining the various objects, will be pointed out in the following description in connection with the accompanying drawing.

In the drawing, Fig. 1 is a side elevation of a tractor driving wheel and a portion of the track belt cooperating therewith, constructed in accordance with my invention.

Fig. 2 is a section on the line 2—2, Fig. 1.

Fig. 3 is a development of a section on the line 3—3, Figs. 1 and 2.

Referring in detail to the construction illustrated, 1 indicates a flexible track belt which is formed with a web or tread section $1^a$ and a longitudinal central rib $1^b$ on the inner side of the web $1^a$, said rib being formed with notches 2 to permit the web of the belt to flex readily. The belt is made of rubber preferably with suitable fabric reinforcement (not shown) of both the web and rib parts.

The belt 1 passes around the driving wheel designated in its entirety by 3. The driving wheel comprises a body 4 having a rim section formed with an annular web part $4^a$ arranged to engage one side of the belt tread $1^b$ and a tread flange $4^b$ arranged to engage the inner side of the web of the belt 1, as shown in Fig. 2. The wheel body 4 and rim parts $4^a$ and $4^b$ can be formed in various ways but I prefer to press them from a single sheet of metal. Opposite the rim parts $4^a$, $4^b$ is arranged a rim section 5 having a web $5^a$ and a tread flange $5^b$. This rim section has its web $5^a$ arranged to engage the other side of the belt rib $1^b$ and its tread flange is adapted to engage the inner side of the belt web. The rim section 5 is co-axial with the rim section $4^a$, $4^b$ and is mounted to turn relative thereto. To operatively support the rim section 5 I provide a cylindrical flange 6 which is secured to the body 4 of the wheel by rivets 7. The rim section 5 is formed at its inner edge with an out-turned flange $5^c$ which slidably fits the flange 6 and is thus firmly supported in co-axial relation with the other rim section of the wheel.

At three points, preferably equally spaced circumferentially, the rim section 5 and the supporting flange 6 are provided with similar co-acting cam devices, a description of one of which will suffice for all. 8 is a cam plate rigidly secured, as by rivets $8^b$, to the rim flange $5^c$ and is formed on its outer face with a double inclined cam surface $8^a$. Adjacent the cam plate 8 the wheel flange 6 is formed with an extension $6^a$ on which is mounted a radially extending bolt 9 carrying an anti-friction roller 10 disposed to engage the cam surface $8^a$. To afford a strong and rigid support for the bolt 9 the flange has riveted to it a collar 12 which, with the flange 6, affords a long and firm support for bolt 9, the latter being secured by a nut 13.

The wheel can be driven in any suitable manner, but in the construction illustrated it is driven by a live shaft 14 the flanged end of which is rigidly secured to the wheel by rivets 15.

In the operation of a tractor provided with my improved belt drive, the friction between the web of the belt 1 and the tread flanges of the rim sections of the driving wheel is sufficient to effect the drive of the tractor when a moderate amount of power is sufficient. If this frictional engagement between the web of the belt and said rim flanges is insufficient to effect the drive, the tread flange $4^b$ will slip on the belt and as the frictional engagement between the belt and the other rim section 5 prevents their relative movement, the slippage between the rim section $4^a$, $4^b$ and the belt results in a turning of that rim section in relation to the rim section 5. This relative movement causes the cam devices to force the rim sections together and grip the belt rib 1^b so that the frictional engagement between the belt and the rim parts of the wheel is rendered very much more effective. The greater the relative turning of the two rim sections of the wheel the greater is the resulting pressure on the belt and the greater the effective driving force.

Several advantages attach to the type of construction which I have illustrated. In particular the arrangement of the coacting cam devices radially close to the rim sections which engage and compress the belt rib, make it possible to use wheel parts relatively light in weight without danger of distorting the parts under the heavy stresses that may be involved. In the constructions that have been previously proposed, for example that shown in French Patent No. 494,526, the corresponding cam devices have been disposed at the hub of the wheel structure radially distant from the points of engagement with the belt so that it was necessary to either make the wheel parts very heavy or, if that were not done, distortion of the parts resulted and the drive was rendered more or less ineffective.

Again I provide three of the coacting pairs of cams and preferably space them equally circumferentially of the wheel. The resulting three-point engagement between the two rim structures obviates all strain and stresses incident to imperfections in construction and thus also makes possible a lighter form of construction than would otherwise be feasible.

While I have shown the belt-gripping surfaces of the wheel disposed radially inside of the tread surfaces thereof and consider such arrangement preferable, it will be understood that the essential features of my invention are applicable whether said gripping surfaces are radially inside or outside of the tread surfaces. And in other respects, while the construction shown in the drawings is that which I prefer it will be understood that various changes can be made without departing from the invention as defined in the appended claims.

What I claim is:

1. In a friction drive mechanism, the combination of an endless belt having inner, outer and lateral surfaces and a wheel structure over which the belt passes, said wheel structure comprising a pair of co-axial relatively turnable rim sections disposed side by side and having treads arranged to engage the inner surface of the belt and lateral surfaces arranged to engage opposite lateral surfaces of the belt, and means on said rim sections adjacent the belt-engaging surfaces thereof adapted when the rim sections turn circumferentially in relation to each other to force said sections together axially and grip the belt between their said lateral surfaces.

2. In a friction drive mechanism, the combination of an endless belt having inner, outer and lateral surfaces and a wheel structure over which the belt passes, said wheel structure comprising a pair of co-axial relatively turnable rim sections disposed side by said and having treads arranged to engage the inner surface of the belt and annular webs arranged to engage opposite lateral surfaces of the belt, and means on said rim sections adjacent the belt-engaging surfaces thereof adapted when the rim sections turn circumferentially in relation to each other to force said sections together axially and grip the belt between their said webs.

3. In a friction drive mechanism the combination of an endless belt having inner, outer and lateral surfaces and a wheel structure over which the belt passes, said wheel structure comprising a pair of co-axial relatively turnable rim sections disposed side by side and having treads arranged to engage the inner surface of the belt and lateral surfaces arranged to engage opposite lateral surfaces of the belt, and three sets of devices connected to said rim sections and substantially equally spaced apart circumferentially and adapted when the rim sections turn circumferentially in relation to each other to force said sections together axially and grip the belt between their said lateral surfaces.

4. In a friction drive mechanism, the combination of an endless belt having inner, outer and lateral surfaces and a wheel structure over which the belt passes, said wheel structure comprising a pair of co-axial relatively turnable rim sections disposed side by side and having treads arranged to engage the inner surface of the belt and lateral surfaces arranged to engage opposite lateral surfaces of the belt, and three sets of devices on said rim sections adjacent the belt-engaging surfaces thereof and substantially equally spaced apart circumferentially, said devices being adapted when the rim sections turn circumferentially in relation to each other to force said sections together axially and grip the belt between their said lateral surfaces.

5. In a friction drive mechanism, the combination of an endless belt formed with a longitudinal rib on its inner side and a wheel structure over which the belt passes, said wheel structure having a disc-like body, a rim section rigid with said body and comprising an annular web adapted to engage one side of the belt rib and a tread flange adapted to engage the inner side of the belt, a second rim section co-axially turnable relative to the other rim section and comprising an annular web adapted to engage the other side of the belt rib and a tread flange adapted to engage the inner side of the belt, means on the wheel body adjacent the rim sections for supporting the turnable rim section, and devices on said supporting means and the turnable rim section adapted when the rim sections turn in relation to each other to force said sections together axially and grip the belt.

6. In a friction drive mechanism, the combination with an endless belt having a longitudinal rib on its inner side, of a wheel structure over which the belt passes, said wheel structure comprising rim portions to engage the inner side of the belt at opposite sides of its rib, annular portions to engage opposite sides of said rib, said annular portions being movable laterally and turnable circumferentially relative to each other, and means disposed adjacent to the rib-engaging portions and adapted by relative circumferential turning of said portions to force the latter together axially to grip the rib of the belt.

7. In a friction drive mechanism, the combination with an endless belt having a longitudinal rib on its inner side, of a wheel structure over which the belt passes, said wheel structure comprising rim portions to engage the inner side of the belt at opposite sides of its rib, annular portions to engage opposite sides of said rib, said annular portions being movable laterally and turnable circumferentially relative to each other, and three sets of devices spaced apart circumferentially and disposed adjacent to the rib-engaging portions and adapted by relative circumferential turning of said portions to force the latter together axially to grip the rib of the belt.

In testimony whereof, I hereunto affix my signature.

GORDON R. PENNINGTON.